(12) United States Patent
Gupta et al.

(10) Patent No.: US 10,216,703 B2
(45) Date of Patent: Feb. 26, 2019

(54) ANALOG CO-PROCESSOR

(71) Applicant: Spero Devices, Inc., Acton, MA (US)

(72) Inventors: Jai Gupta, Westford, MA (US); Nihar Athreyas, Acton, MA (US); Abbie Mathew, Westford, MA (US); Blair Perot, Amherst, MA (US)

(73) Assignee: Spero Devices, Inc., Acton, MA (US)

( * ) Notice: Subject to any disclaimer, the term of this patent is extended or adjusted under 35 U.S.C. 154(b) by 41 days.

(21) Appl. No.: 15/427,591

(22) Filed: Feb. 8, 2017

(65) Prior Publication Data

US 2017/0228345 A1 Aug. 10, 2017

Related U.S. Application Data

(60) Provisional application No. 62/292,458, filed on Feb. 8, 2016.

(51) Int. Cl.
*G06F 17/16* (2006.01)
*G06F 17/14* (2006.01)
*G06N 3/063* (2006.01)
*G06G 7/16* (2006.01)
*G06G 7/19* (2006.01)

(52) U.S. Cl.
CPC ............ *G06F 17/16* (2013.01); *G06F 17/141* (2013.01); *G06G 7/16* (2013.01); *G06G 7/19* (2013.01); *G06N 3/0635* (2013.01)

(58) Field of Classification Search
CPC ......... G06F 17/16; G06F 17/141; G06G 7/16; G06G 7/19; G06N 3/0635

USPC .......................................................... 708/821
See application file for complete search history.

(56) References Cited

U.S. PATENT DOCUMENTS

| | | | |
|---|---|---|---|
| 9,152,827 B2 | 10/2015 | Linderman et al. | |
| 9,646,243 B1 | 5/2017 | Gokmen | |
| 9,824,753 B2 | 11/2017 | Hamdioui et al. | |
| 2014/0172937 A1* | 6/2014 | Linderman ............... | G06G 7/16 708/607 |
| 2014/0289179 A1 | 9/2014 | Di Castro et al. | |

(Continued)

OTHER PUBLICATIONS

Wu, W., et al., "Sub-10 nm patterning using Nanoimprint lithography," Nanofabrication, Wei Wu Research Group, University of Southern Group, retrieved from the Internet URL: http://wugroup.usc.edu/research.php, Nov. 26, 2016.

(Continued)

*Primary Examiner* — Tan V Mai
(74) *Attorney, Agent, or Firm* — Hamilton, Brook, Smith & Reynolds, P.C.

(57) ABSTRACT

A co-processor is configured for performing vector matrix multiplication (VMM) to solve computational problems such as partial differential equations (PDEs). An analog Discrete Fourier Transform (DFT) can be implemented by invoking VMM of input signals with Fourier basis functions using analog crossbar arrays. Linear and non-linear PDEs can be solved by implementing spectral PDE solution methods as an alternative to massively discretized finite difference methods, while exploiting inherent parallelism realized through the crossbar arrays. The analog crossbar array can be implemented in CMOS and memristors or a hybrid solution including a combination of CMOS and memristors.

17 Claims, 7 Drawing Sheets

(56) References Cited

U.S. PATENT DOCUMENTS

| | | | |
|---|---|---|---|
| 2015/0170025 A1* | 6/2015 | Wu | G06N 3/0445 |
| | | | 706/25 |
| 2016/0224465 A1* | 8/2016 | Morad | G06F 9/3877 |
| 2017/0124025 A1 | 5/2017 | Gokmen | |

OTHER PUBLICATIONS

Kannan, S., et al., "Sneak-Path Testing of Crossbar-Based Nonvolatile Random Access Memories," IEEE Transaction on Nanotechnology, vol. 12, Issue 3, pp. 413-426, May 2013.

Shevgoor, Manjunath, et al., "Designing a Fast and Reliable Memory with Memristor Technology," University of Utah, HP Labs, 2 pages, Jan. 2016.

Choi, B. J., et al., "Electrical Performance and Scalability of Pt Dispersed $SiO_2$ Nanometallic Resistance Switch," *Nano Letters*, vol. 13, No. 7, pp. 3213-3217, Jun. 7, 2013.

Yang, J. J., et al., "High switching endurance in $TaO_x$ memristive devices," *Applied Physics Letters*, vol. 97, p. 232102, Dec. 2010.

Shafiee, Ali , et al., "ISAAC: A convolutional neural network accelerator with in-situ analog arithmetic in crossbars," Proceedings of the 43rd International Symposium on Computer Architecture, ACM SIGARCH Computer Architecture News, vol. 44, Issue 3, pp. 14-26, Jun. 2016.

Notification of Transmittal of the International Search Report and the Written Opinion of the International Searching Authority for Int'l Application No. PCT/US2017/016955, "Analog Co-Processor," dated May 26, 2017.

Strachan, J.P., "The Dot-Product Engine (DPE): exploring high efficiency analog multiplication with memristor arrays," Presentations at the $4^{th}$ IEEE Rebooting Computing Summit (RCS4): Dec. 9-11, 2015, 29 pages, Dec. 11, 2015.

Hu, M., et al., "Dot-Product Engine: Programming Memristor Crossbar Arrays for Efficient Vector-Matrix Multiplication," Posters at ICCAD'15 Workshop on Energy Efficient Computing in the Dark Silicon Era, 1 page, Nov. 5, 2015.

Hu, M., et al., "Dot-Product Engine for Deep Learning," Posters at ICCAD'15 Workshop on Hardware and Algorithms for Learning On-a-Chip, 1 page, Nov. 5, 2015.

Kim, Y., et al., "A Reconfigurable Digital Neuromorphic Processor With Memristive Synaptic Crossbar for Cognitive Computing," ACM Journal on Emerging Technologies in Computer Systems, vol. 11, No. 4, pp. 38-1-38-25, Apr. 26, 2015.

Indiveri, G., et al., "Integration of Nanoscale Memristor Synapses in Neuromorphic Computing Architectures," Nanotechnology, vol. 24, No. 38, 384010, 13 pages, Sep. 2, 2013.

International Preliminary Report on Patentability for Int'l Application No. PCT/US2017/016955, "Analog Co-Processor," dated Aug. 14, 2018, 8 pages.

\* cited by examiner

US 10,216,703 B2

ANALOG CO-PROCESSOR

RELATED APPLICATION

This application claims the benefit of U.S. Provisional Application No. 62/292,458, filed on Feb. 8, 2016. The entire teachings of the above application are incorporated herein by reference.

GOVERNMENT SUPPORT

This invention was made with government support under DARPA Phase 1 STTR Contract Number D16PC00084. The government has certain rights in the invention.

BACKGROUND

A memristor is a device that behaves as an electrical resistance switch that can retain a state of internal resistance based on history of applied voltage and current. The memristor can store and process information, and offers several performance characteristics that exceed that of conventional integrated circuit technology. An important class of memristive device is a two-terminal resistance switch based on ionic motion, which is built from a simple conductor-insulator-conductor thin-film stack. For large scale applications, the memristor device can be used in the form of crossbar array.

SUMMARY

In one embodiment, a circuit provides analog co-processing via vector-matrix multiplication (VMM). The circuit may include a signal generator, a memristor network, and supporting input/output (I/O) circuitry. The signal generator generates a programming signal based on at least one coefficient for VMM. The memristor network includes an array of memristors. A read/write control circuit may be configured to selectively enable read and write operations at the memristor network. A memristor control circuit may be configured to selectively enable a selection of the memristors, where the memristor control circuit may include one or more of a column switch multiplexor, a row switch multiplexor, and an address encoder. A write circuit may be configured to set at least one resistance value within the network based on the programming signal, where the write circuit may including a voltage converter/driver. A read input circuit may be configured to apply at least one input signal to the memristor network, the input signal corresponding to a vector, where the read input circuit may include a voltage converter/driver. A readout circuit may be configured to read at least one current value at the memristor network and generate an output signal based on the at least one current value.

In further embodiments, the memristor network may include a plurality of memristors arranged in a voltage divider configuration. The memristor network may further include an array of circuit elements, each of the circuit elements including a memristor in series with a transistor, the transistor configured to selectively enable current through the respective memristor.

In still further embodiments, the programming signal may be based on at least one discrete fourier transform (DFT) coefficient. The memristor network includes a plurality of subarrays of memristors, a first subarray of the plurality being applied to a real component of the DFT coefficient, and second subarray of the plurality being applied to an imaginary component of the DFT subarray. The input signal may have a voltage value being a function of the input vector intended for multiplication. The readout circuit may be further configured to generate the output signal as a VMM function of the result of the vector and programmed resistance values of the memristor network.

In yet further embodiments, the readout circuit may be further configured to detect currents at a plurality of nodes of the memristor network, where the output signal is a function of the currents. The readout circuit may further comprise an analog-to-digital converter (ADC) configured to output a digital value representing the output signal. The write circuit may be further configured to generate at least one analog set signal based on a multiplicative coefficient to set the at least one resistance value based on the programming signal, where the at least one analog signal is applied to the memristor network. A digital-to-analog converter (DAC) may be configured to generate the at least one analog set signal based on the programming signal.

In yet still further embodiments, a digital-to-analog converter (DAC) may be configured to generate the at least one input signal based on the vector. The readout circuit may further include a transimpedence amplifier configured to convert the output current to a voltage value, the output signal including the voltage value. The read circuit may be further configured to generate at least one analog input signal to multiply with at least one resistance value of the memristor network, the at least one analog input signal being applied to the memristor network.

Further embodiments include a co-processor circuit comprising an array of vector matrix multiplication (VMM) circuits, as well as supporting I/O circuitry. The array of VMM circuits may include one or more of the features described above, including a signal generator configured to generate a programming signal based on at least one coefficient for VMM and a memristor network. Further, a read DAC array may be configured to convert at least one input vector into an analog signal to be applied to the memristor network. A write DAC array may be configured to convert at least one set signal, based on a multiplicative coefficient, to an analog set signal to be applied to the memristor network. An ADC array may be configured to convert at least one VMM analog output from the memristor network into digital values. A shift register array may be configured to format the digital values of the ADC array. An adder array may be configured to add outputs from the memristor network arrays, each of the adders performing a subset of a VMM operation associated with the coefficient. A combiner may be configured to combine the output signal of each of the adder arrays to generate a combined output signal.

In further embodiments, a processor may be configured to generate the programming signal for each of the VMM circuits based on a mathematical operation. The mathematical operation may include an operation to solve at least one partial differential equation (PDE). The mathematical operation may also include at least one N-bit fixed-point computation, the VMM circuits configuring a plurality of the respective memristors to represent T-bit subsets of an N-bit total. The mathematical operation may further include at least one N-bit floating point computation, the VMM circuits configuring a plurality of the respective memristors to represent T-bit subsets of an N-bit total.

In still further embodiments, the at least one coefficient for VMM may correspond to a Discrete Fourier Transform (DFT). The array may be configured to process a 2D DFT by applying the at least one coefficient for VMM corresponding to a first 1D DFT to a first subset of the array, and applying the output of the first subset as the input to a second 1D DFT to a second subset of the array. The at least one coefficient for VMM may correspond to a Discrete Fourier Transform (DFT) to solve partial differential equations through spectral methods. Further, the at least one coefficient for VMM may correspond to a Discrete Fourier Transform (DFT) to perform range-doppler signal processing.

In yet further embodiments, the at least one coefficient for VMM may correspond to convolution coefficients to perform inference in a convolutional neural network. The at least one coefficient for VMM may corresponds to a Green's function representation to solve partial differential equations. The combiner may be further configured to interface with a Peripheral Component Interconnect Express (PCIe) host processor.

In still further embodiments, the at least one coefficient for VMM may correspond to a meshed Green's function representation to solve partial differential equations. The at least one coefficient for VMM may correspond to an energy minimization optimization problem solved through the conjugate gradient method. The conjugate gradient method may be configured to solve partial differential equations. The conjugate gradient method may be configured to perform a backpropagation algorithm within a neural network.

Further embodiments may include a method for performing VMM operations. A programming signal may be generated based on at least one coefficient for VMM. Read and write operations are selectively enabled at a memristor network having an array of memristors. A selection of the memristors are selectively enabled. At least one resistance value within the network may be set based on the programming signal. At least one input signal may be applied to the memristor network, the input signal corresponding to a vector. At least one current value at the memristor network may be read and an output signal may be generated based on the at least one current value.

Example embodiments provide include analog co-processors configured for solving partial differential equations (PDEs). Further, an analog Discrete Fourier Transform (DFT) can be implemented by invoking vector matrix multiplication (VMM) of input signals with Fourier basis functions using analog crossbar arrays. Linear and non-linear PDEs can be solved by implementing spectral PDE solution methods as an alternative to massively discretized finite difference methods, while exploiting inherent parallelism realized through the crossbar arrays. The analog crossbar array can be implemented in CMOS and memristors or a hybrid solution including a combination of CMOS and memristors.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
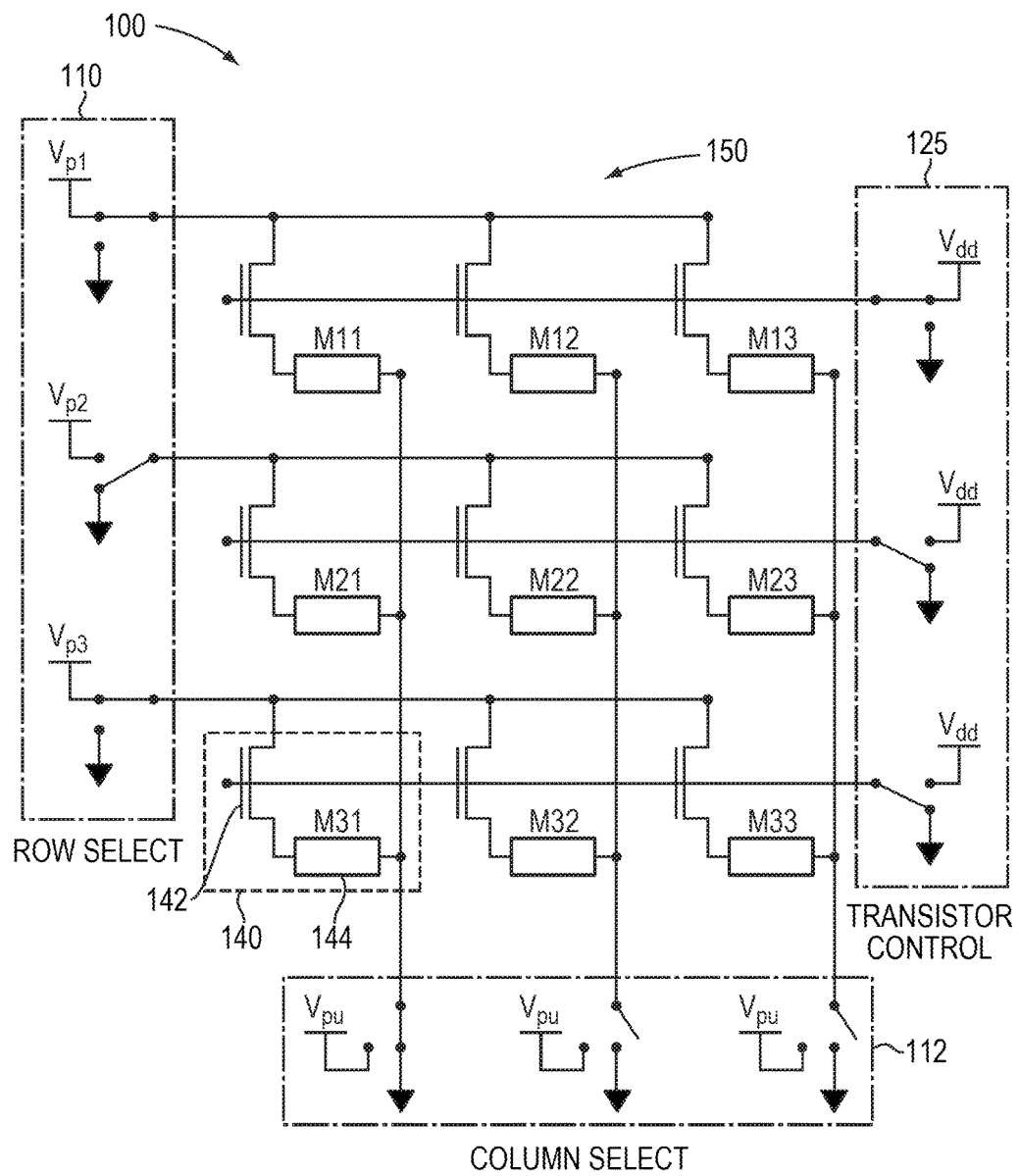
FIG. 1 is a circuit diagram of a transistor/memristor crossbar array that may be implemented in one embodiment.

FIG. 1 is a circuit diagram of a transistor/memristor crossbar network 100 that may be implemented in one embodiment. The network 100 includes a transistor/memristor array 150 (also referred to as a crossbar or crossbar array), which comprises a number of cells (also referred to as devices), including cell 140, arranged into rows and columns. The cell includes a memristor 144 connected in series with a transistor 142, where the transistor 142 selectively enables current through the respective memristor 144. The gate of the transistor 142 may be connected to a transistor control circuit 125 for controlling said current. Further, a row select circuit 110 and a column select circuit 112 selectively enable current through a given row and a given column of cells. The transistor control circuit 125, row select circuit 110 and a column select circuit 112 together enable a current to be applied to a selection of one or more cells of the array 150, while preventing current to unselected cells.

Memristor cross bar arrays, such as the array 150 of the network 100, may offer several beneficial features, such as high scalability, fast switching speed, non-volatility, large resistance ratio, non-destructive read, 3D stackability, high CMOS compatibility and manufacturability. However, the architecture can also have several application-dependent challenges. With regard to vector matric multiplication (VMM) in particular, achieving high device isolation in the crossbar array and obtaining acceptable analog behavior are substantial problems.

The operation of each memristor device in a memristor crossbar array affects the operation of other devices in close proximity. For example, a crossbar array may exhibit a phenomenon called "sneak path current," which is the sum of currents flowing through the unselected memristor devices. This phenomenon is reduced by using a selection device, which may be connected to each column or row of a crossbar array to drive memristive switching. The total current the selection device can drive may be determined by its channel width. However, a terminal selection device may have high nonlinearity in its current-voltage relation. This effect compromises the Ohm's law, and therefore a three-terminal selector (e.g. the transistor 142) may be used to mitigate the sneak path current issue and provide acceptable analog behavior, although transistor size limits the achievable memristor crossbar density. A transistor in series with a memristor device at each crosspoint, as shown in FIG. 1, may be called as 1T1M (or 1T1R) architecture. By controlling the current compliance of a memristor during ON switching, the resistance value of each cell 140 of the array 150 can be set to any target value between the high resistance state (HRS) and the low resistance state (LRS), which is referred to as analog behavior. In the 1T1M structure, the control of the current compliance can be readily realized by setting the gate voltage of the transistor at different levels. This enables programming of analog values in the memristor 144.

Figure 2:
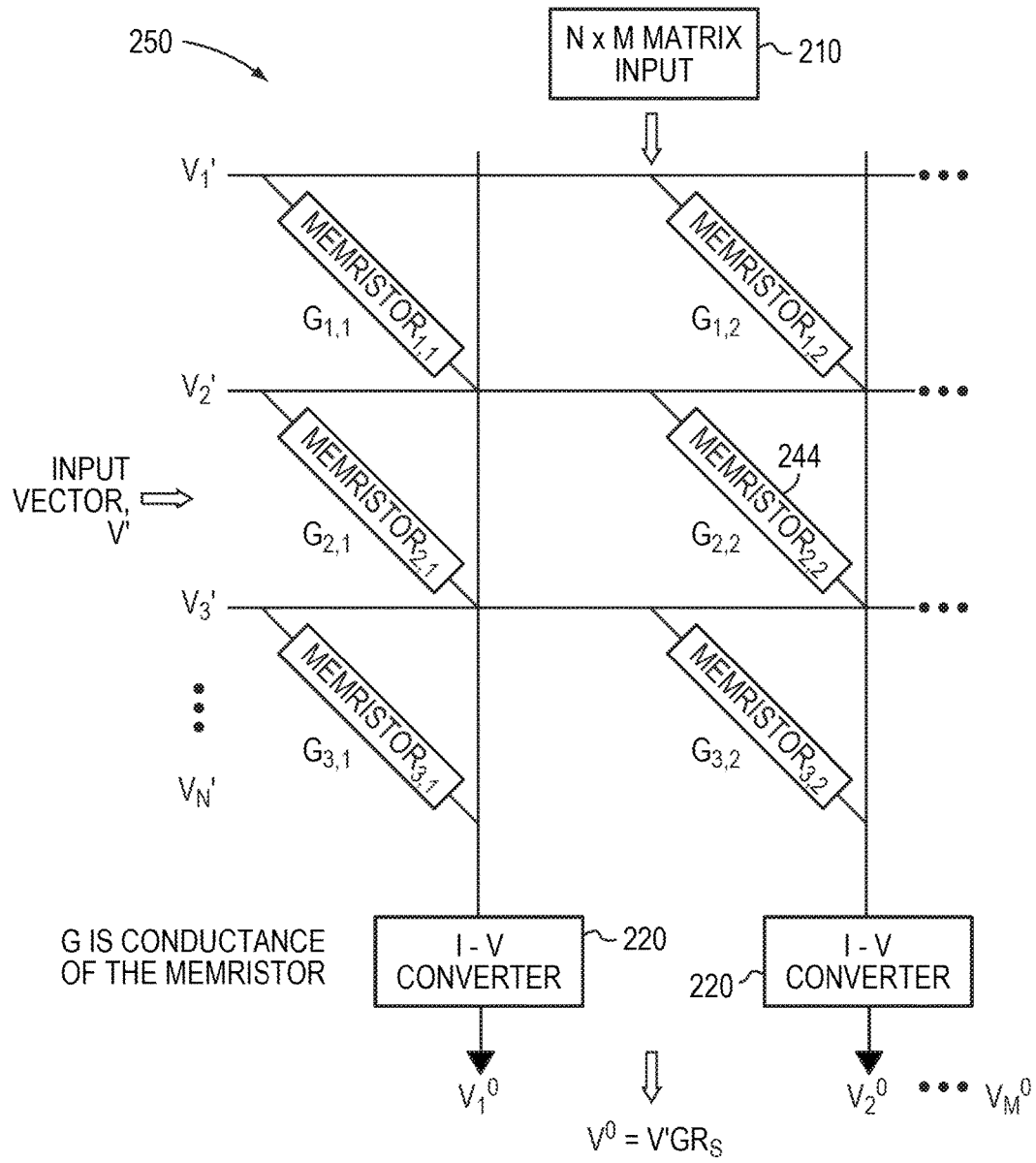
FIG. 2 is a circuit diagram of a memristor array.

FIG. 2 is a circuit diagram of a memristor array 250, which may include one or more features of the network 100 described above. In particular, the array 250 may include multiple rows ($V_1^I$-$V_N^I$) and columns ($V_1^O$-$V_M^O$) of memristors (e.g., memristor 244). Each memristor may also be configured with a selection device (e.g., a transistor) to form a cell such as the cell 140 described above.

Memristor crossbar arrays such as the array 250 can implement matrix-related computations, and can achieve more than 100× improvement in computing speed compared to a graphics processing unit ("GPU") or other accelerators due to the highly parallel computing model, efficient use of electrical signals, and laws of physics in the hardware implementation. The low operating energy (<pJ) of the memristor device further reduces the power consumption. The vector and matrix computations are executed through memristor crossbar arrays. As shown in FIG. 2, input voltages $V^I$ corresponding to an input vector are applied along the rows of an N×M array, which has been programmed according to an N×M matrix input 210. The output currents are collected through the columns by measuring output voltage $V^O$. At each column, every input voltage is weighted by the corresponding memristance ($1/G_{ij}$) and the weighted summation appears at the output voltage. Thus, the relation between the input and output voltages can be represented in a vector matrix multiplication form $V^O=-V^I GR_s$ (negative feedback of op-amp), where G is an N×M matrix determined by conductances of the memristor crossbar array.

Device variability can be reduced by adopting superior switching materials (such as $TaO_x$, and $HfO_x$) and fabrication processes. Feedback circuits can be readily adopted in VMM applications to switch cells to target values. To provide a VMM operation, small voltages may be applied as inputs on the rows of the array 250, and the output currents or voltages on the columns may be measured. For example, an output current at each column may be read by converter circuit 220 and converted into a corresponding voltage. The applied voltages may remain lower than the effective switching threshold voltage of the memristor devices and, thus, do not induce any noticeable resistance changes in the adjoining ones. This operation may be referred to as a "memristor read," which can be repeatable with infinite endurance cycles and low error rates or imprecision. The more challenging, but less frequent VMM operations, are mapping a matrix on a memristor crossbar array, which requires programming (writing) resistance values into the memristor devices in the crossbar array.

Many applications in scientific computation, including solution of partial differential equations (PDEs), use floating point computation. An analog co-processor, in embodiments described below, supports vector-matrix multiplication in floating point format in addition to the fixed-point style computation described in the introduction and background section. Floating point is a representation of real numbers that trade-off between range and precision. In a floating-point representation, the number is represented by a fixed number of significant digits called the significand and scaled using an exponent in some fixed base. The general representation is of the form: significand×base$^{exponent}$. A variety of floating point representations have been used over the years, but since the 1990s the most commonly used floating point representation is as defined by IEEE754 standard.

The exponent for the 16-bit floating point is a 5-bit unsigned integer from 0 to 31. The actual exponent value used is the exponent value with a bias subtracted. The bias value for a 16-bit floating point representation is 15. So the effective value of the exponent ranges from −15 to 16. The true significand includes 10 fraction bits to the right of the binary point with an implicit leading bit. Only 10 fraction bits are stored in memory but the total precision is 11 bits. This corresponds to 3.311 decimal digits.

The exponent for the 32-bit floating point is an 8-bit unsigned integer from 0 to 255. The actual exponent value used is the exponent value with a bias subtracted. The bias value for a 32-bit floating point representation is 127. So the effective value of the exponent ranges from −127 to 128. The true significand includes 23 fraction bits to the right of the binary point with an implicit leading bit. Only 23 fraction bits are stored in memory but the total precision is 24 bits. This corresponds to 7.22 decimal digits.

The binary representation for the 16-bit floating point number may be given by the following equation:

$$(-1)^{b15} \times (1 \cdot b_9 b_8 \ldots b_0) \times 2^{b14 b13 \ldots b10 - 15}$$

This equation yields a decimal value of:

$$(-1)^{sign} \times \left(1 + \sum_{i=1}^{10} b_{23-i} 2^{-i}\right) \times 2^{e-15}$$

The minimum normalized positive value that can be represented using a 16-bit floating point representation is $2^{-14}=6.1\times10^{-5}$ and the maximum value is $(2-2^{-10})\times 2^{15}=65504$. The minimum normalized positive value that can be represented using a 32-bit floating point representation is $2^{-126}=1.18\times10^{-38}$.

Regarding floating point addition, two floating point numbers X and Y may be added. The significands of X and Y are denoted as $X_s$ and $Y_s$ and the exponential parts are denoted as $X_e$ and $Y_e$ respectively. The floating-point numbers can be added as follows: (a) Convert both numbers into scientific notation by explicitly representing the '1'. (b) In order to add these numbers, the exponents should be the same. This step is achieved by shifting the radix point of the mantissa. (c) Add the two mantissas. (d) Adjust the result and represent it as a floating-point number.

Regarding floating point multiplication, two floating point numbers X and Y may be multiplied. The significands of X and Y are denoted as $X_s$ and $Y_s$ and the exponential parts are denoted as $X_e$ and $Y_e$ respectively. The multiplication of X and Y is then given by:

$$X \cdot Y = (X_s \cdot Y_s) 2^{X_e + Y_e - 15}$$

In embodiments described below, floating point numbers may be handled by normalizing the exponents, which converts them into fixed point values with the mantissas aligned. Normalizing the exponents requires bit-shifting and padding, which are direct functions of the difference between the largest and smallest exponential values being handled. In some applications, the values can be as large as 278 bits for single precision floating point computation. To circumvent this problem, elements of each column of the VMM array may be aligned. This arrangement takes advantage of the fact that the difference between the exponents of the neighboring elements is significantly less than the extreme values. The same normalization procedure may be followed for the vector inputs that are used to multiply with the matrix values. The normalized exponent values of each column of the crossbar array can be stored, to be used during the de-normalization process, which converts the multiplied and accumulated results back to floating point precision.

Figure 3:
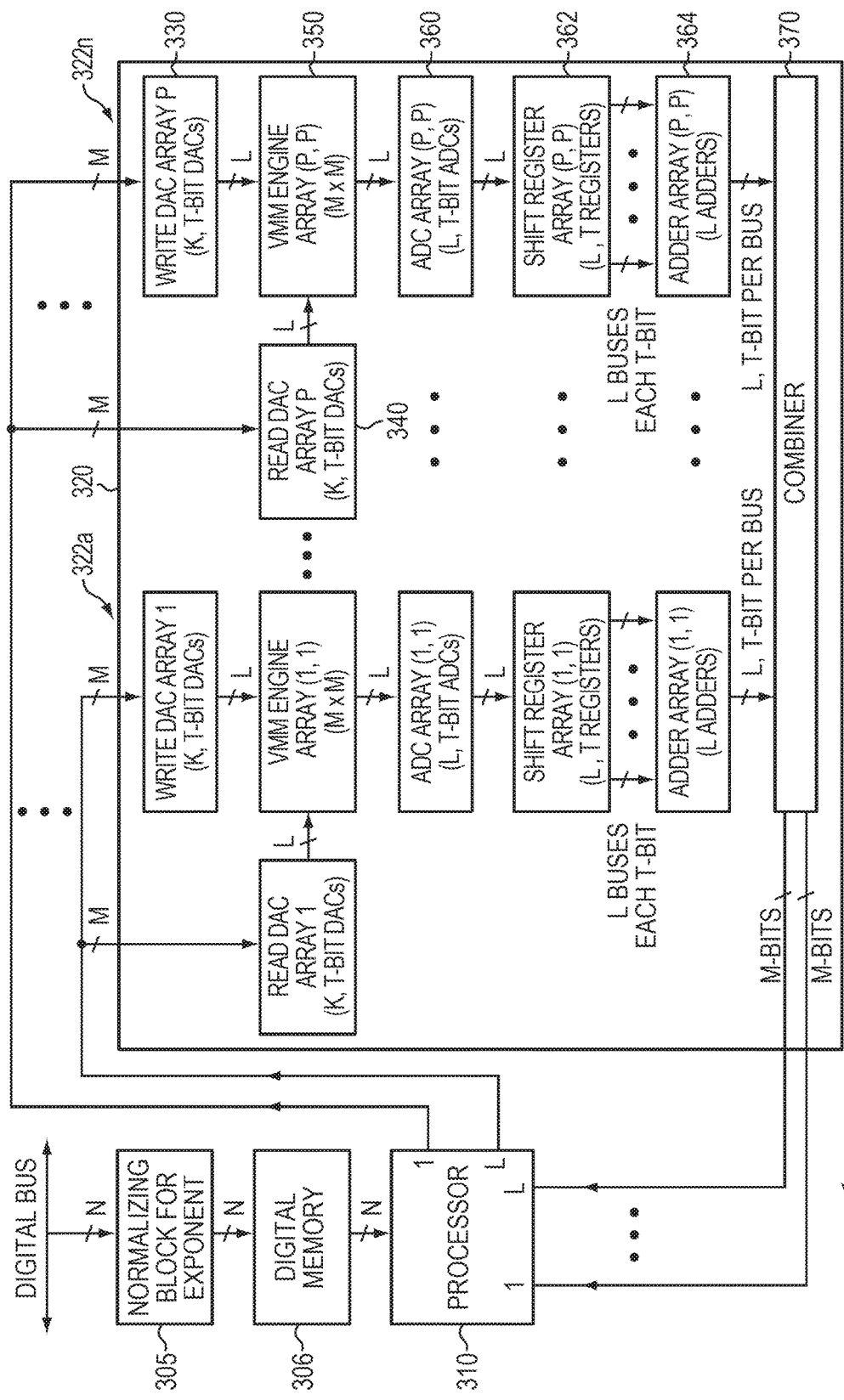
FIG. 3 is a block diagram of a system including a co-processor in one embodiment.

FIG. 3 is a block diagram of a co-processor 300 in one embodiment, which may be applied to perform computations such as N-bit floating point computations. The co-processor 300 may be referred to as an analog co-processor, as it implements analog circuitry (e.g., one or more memristor networks) to perform computations as described below. The data required for the computation may be received from a digital data bus (e.g., a PCIe bus) to a normalizing block 305 for exponents, which normalizes blocks of data by making their exponents the same. These normalized values may be stored to an on-chip digital memory 306, which is accessed through a N-lane bus by a processor 310. The processor 310 interfaces with a VMM core 320. The VMM core 320 may operate as the computational core of the co-processor, and may be made of up an array of P×P VMM engines. For clarity, two lanes 322a, 322n of such an array are shown. A given lane 322n may include write and read digital-to-analog converters (DACs) 330, 340, a P×P VMM engine array 350, an analog-to-digital converter (ADC) array 360, a shift register array 362, and an adder array 364. Each VMM engine (e.g. engines of the VMM engine array 350) may include an M×M memristor crossbar array (e.g., arrays 150, 250 as described above), as well as respective read and write circuitry along with the row and column multiplexers, which are used to address the memristors for read and write operations. An example VMM engine is described in further detail below with reference to FIG. 5.

Figure 4:
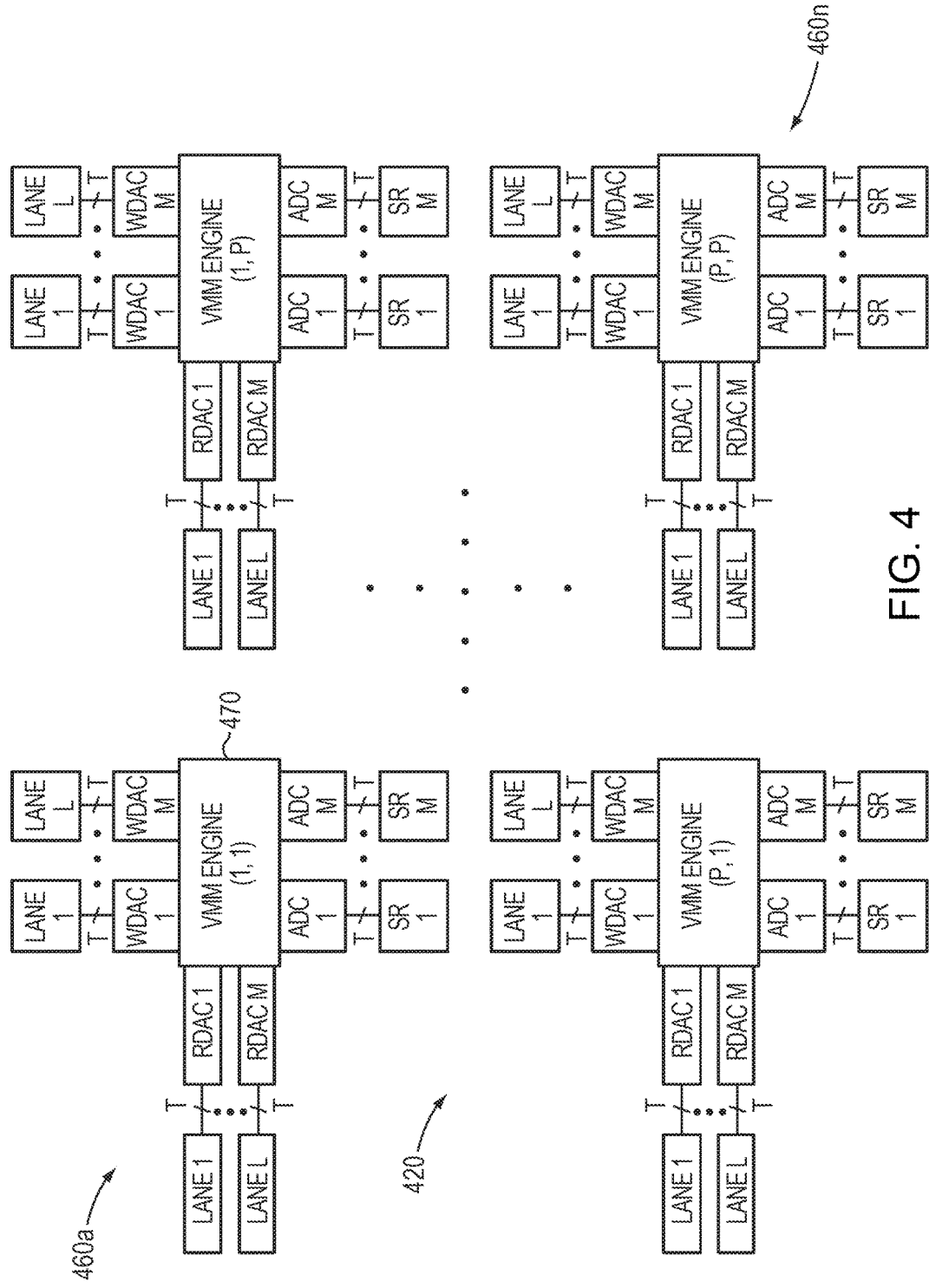
FIG. 4 is a block diagram of an array of vector matrix multiplication (VMM) engines that may be implemented in the co-processor of FIG. 3.

FIG. 4 is a block diagram of an array 420 of vector matrix multiplication (VMM) engines (e.g., VMM engine 470) that may be implemented in the VMM core 320 of the co-processor 300 of FIG. 3. Each of the VMM engines 470 may be connected to respective DACs and ADCs to form individual cells 460a-n of the array.

Figure 5:
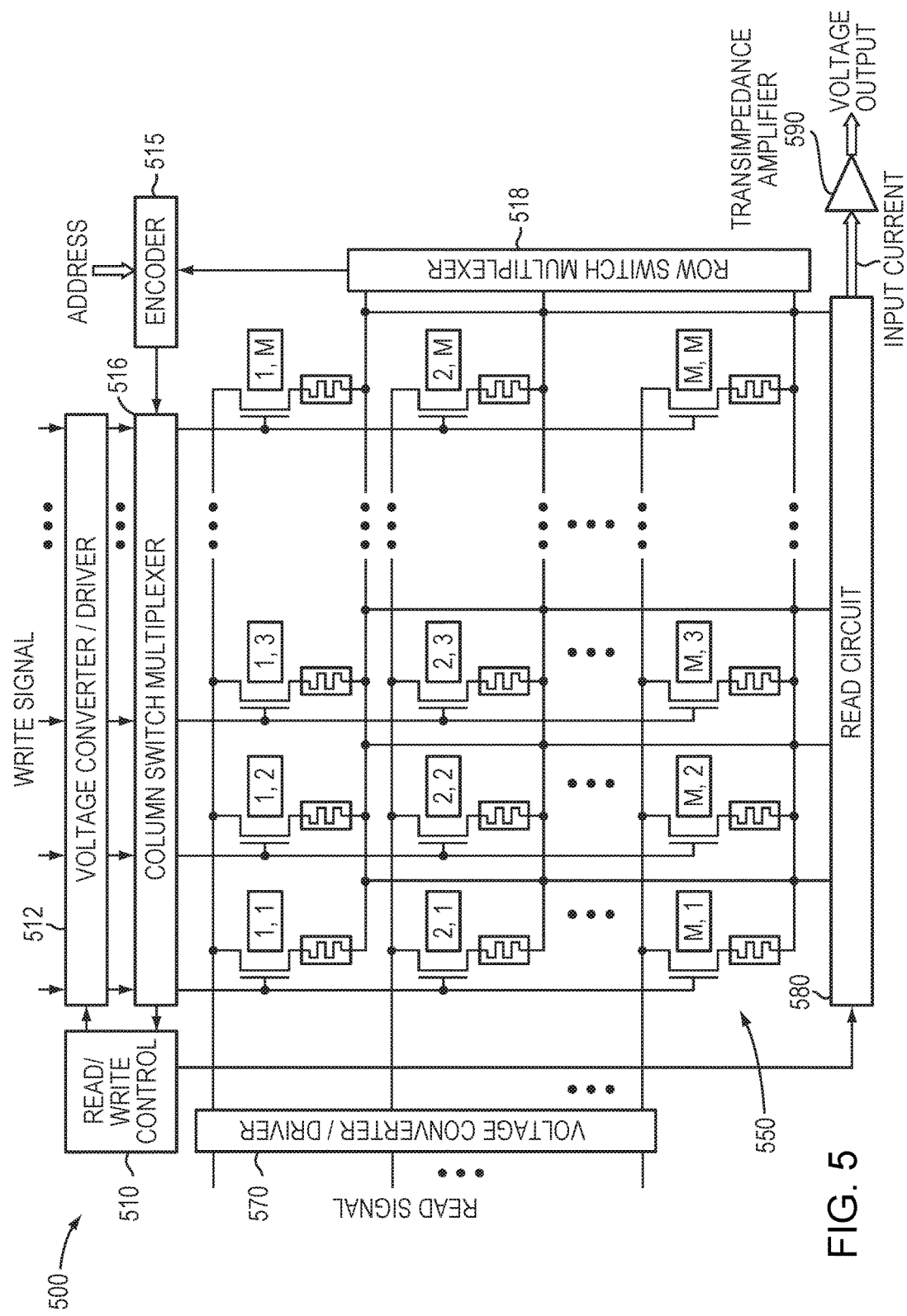
FIG. 5 is a block diagram of a VMM engine in one embodiment.

FIG. 5 is a block diagram of a VMM engine 500. The VMM engine 500 may be implemented as an engine of the VMM engine array 350 of the VMM core 320 of the co-processor 300 of FIG. 3, and may be implemented as a VMM engine 460 of the array 420 of FIG. 4. The VMM engine 500 may include a memristor network 500 having an array (1,1-M,M) of memristor cells comprising a switch and a memristor connected in series, and may include one or more features of the memristor network 100 and array described above with reference to FIGS. 1 and 2. The VMM engine further includes circuitry to program the memristor network 550 by setting resistance values of the memristors in the network 550 (also referred to as a "write operation"), and circuitry to apply an input signal to the programmed memristor network 550 and detect a resulting current and/or voltage (also referred to as a "read operation").

In particular, a read/write control circuit 510 may selectively enable read and write operations. For a write operation, a voltage converter/driver 512 may receive a programming signal ("write signal") and generate a corresponding signal (e.g., a voltage value) for setting resistance values of the memristor network 550. A column switch multiplexer 516 and a row switch multiplexer 518 enable selection of one or more of the memristor cells of the array 550. An encoder circuit 515 converts an address signal into signals indicating a subset of the memristor cells for selection by the multiplexers 516, 518. For a read operation, a voltage converter/driver 570 may receive a "read signal" indicating a vector and apply a corresponding set of input signals to the memristor network 550. A readout circuit 580 may then receive and combine the resulting current through the memristor network 550, and a transimpedence amplifier 590 may receive the resulting current and generate an output signal having a voltage value based on the current.

Operation of a co-processor and respective VMM engines, in example embodiments, are described below with reference to FIGS. 3-5.

Write Operation

Referring again to FIG. 3, in order to enable the co-processor 300 to perform a computation, the respective VMM engines may undergo a write operation, which may set the resistance values of the memristors of the VMM engines. The write DAC array 330, in particular, may write the matrix values into the memristors of the VMM engine array 350. Because the size of each VMM engine 500 is M×M, the number of write DACs per VMM engine may also be M. Each write DAC 330 writes T-bits into each memristor, and one entire row may be written in a single clock cycle. The write DAC array 330 may utilize the write circuitry of each VMM engine 500 (FIG. 5) to write into the memristors of the engine memristor array 550.

Because the exponents have been normalized (e.g., by the normalizing block 305), only the mantissas may require handling by the co-processor 300. An N-bit floating point number has M mantissa bits. Hence, P VMM engines in each row may be required to handle the M bits at T-bits per cell. For example, the first memristor of VMM engine "1" (e.g., engine 500) may store the T MSB bits, and the first memristor of VMM engine "P" stores the T LSB bits. The other (P−1) rows of the VMM engines may have the same values being written into them. Each write DAC 330 may have a T-bit input from each lane of the processor 310. This T-bit digital data may be converted into a single analog value, which is stored as a memristor conductance state. Each row of the VMM engine 500 may be written in a single clock cycle. Given a memristor write time of 4 ns, for example, then a M×M crossbar may require M*4 ns to write all the values. The write operation can be considered an overhead because the VMM operation cannot begin until all the memristors have been written into. In order to avoid this overhead, an interleaved approach may be used where two VMM cores will be operated in an interleaved manner.

Read Operation

Once all of the memristors of the network 550 have been written, the VMM engines of the VMM core 320 can be used to perform the read operation (a VMM operation). As shown in FIG. 3, each VMM engine array 350 has its own read DAC array 340. Each DAC of the array 340 may be T-bits wide and inputs a T-bit value into each row of the memristor crossbar array. Because the size of the VMM engine is M×M, the number of read DACs in each array is also M. The read and the write operations may be sequential and, hence, the same M lanes may be used for both the read and write operations. The read DACs 340 may be used to input a vector into the memristor crossbar arrays of the VMM engine array 350. The read DACs may provide an input vector to multiply with the matrix values stored in the memristor crossbar array. Because the input vectors are also N-bit floating point numbers, the mantissa is M-bits wide. Each DAC 340 has a T-bit input as shown in the figure. Thus, the computation requires [P=(M/T)] columns of VMM engines to handle the M mantissa bits. The T-bit digital data may be converted into a single analog value. Each column of the VMM engines may receive the same input vector through the read circuitry 570 (FIG. 5). The resulting VMM outputs along each column can be read out using the readout circuit 580.

The analog outputs of each VMM engine 500 may be digitized using column parallel ADCs 360 as shown in FIG.

3. Each ADC may be T-bits wide, and each VMM engine 500 may have M ADCs. The analog co-processor 300 may handle M-bit mantissa of the N-bit floating point number, but each memristor may store only T-bits of information. Hence, the M-bit mantissa may be broken down into M/T pieces of T-bit numbers. After the VMM operation has been performed and the outputs have been digitized, the bits can be shifted to their correct bit positions. For this purpose, shift registers 362 may be implemented at the output of each ADC 360. Each shift register array 362 may have a different bit shift setting. After the bits have been shifted, the outputs of each column of the VMM engine 500 may be added to the corresponding columns by adder array 364. Each adder of the array 364 may have P inputs from the P VMM columns in each row. Similarly, the columns of the other VMM engines may also be added together using the adders of the array 364. Each row of the VMM core 320 may have a set of P adders of the adder array 364. The outputs of the adders 364, which are T-bits long, may be combined using a combiner 370 to form an M-bit mantissa output. These outputs may be stored to an on-chip digital memory 306 and transmitted across the digital bus.

Figure 6:
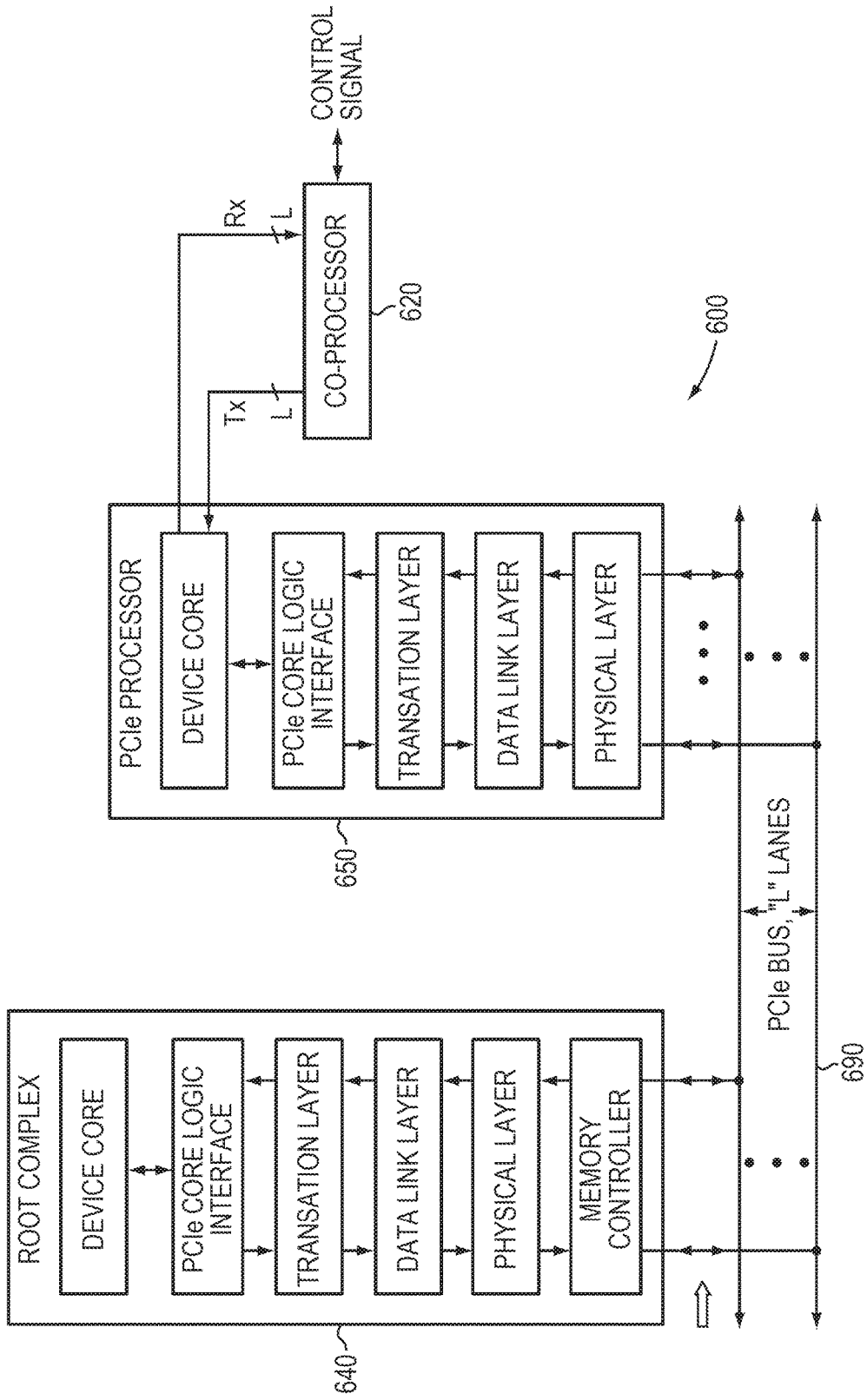
FIG. 6 is a block diagram of a Peripheral Component Interconnect Express (PCIe) architecture in which an embodiment may be implemented.

FIG. 6 is a block diagram of a Peripheral Component Interconnect Express (PCIe) architecture in which an embodiment may be implemented. PCIe is a serial point-to-point interconnect topology to connect peripherals in computing and communication platforms. A PCIe 'lane' comprises two simplex interconnect links between two PCIe devices, each in opposite directions. The PCIe standard offers the flexibility of increasing throughput by adding lanes between devices. PCIe version 3.0, for example, permits simplex lanes to be added in increments of 1, 2, 4, 8, 12, 16 and 32. The number of lanes, denoted by 'L', may affect the size and performance of a co-processor interfacing with devices under a PCIe architecture.

As illustrated in FIG. 6, a CPU chipset 640 and a PCIe processor host 650 are communicatively coupled via a PCIe bus 690. The PCIe host processor 650, in turn, may communicate with a co-processor 620, which may include features comparable to those of the co-processor 300 described above. In operation, the CPU chipset 640 may be transmitting to the co-processor 620. Data payloads may be created at the device core of the chipset 640 and are sent to three layers (transaction layer, data link layer, and physical layer) where overheads are appended to ensure reliable delivery of the packets in the correct sequence to the corresponding layer in the PCIe processor 650. The constructed packets may then be presented to the memory controller of the chipset 640, which is physically connected to the PCIe bus 690 and determines a lane on which to insert the packets. As the packets flow from the physical layer to the transaction layer in the PCIe controller 650, each layer strips off its overhead and reliable data payload is delivered in the right sequence to the device core. The PCIe processor 650 host deconstructs the packet and delivers the payload to the co-processor 620.

Similarly, the PCIe processor host constructs the packets from the data payload created by the co-processor 620 and sends them reliably and in the correct sequence to the device core in the CPU chipset 640. The function of the PCIe processor can be implemented, for example, in a Xilinx FPGA, communicating with the CPU chipset 640 and controlling and programming the co-processor 620. Provisions of the PCIe protocol may be implemented to control and program the co-processor 620. Additionally, "out of band" control and programming of the co-processor 620 can be performed in a software program such as MATLAB residing, for example, in a host workstation.

Figure 7:
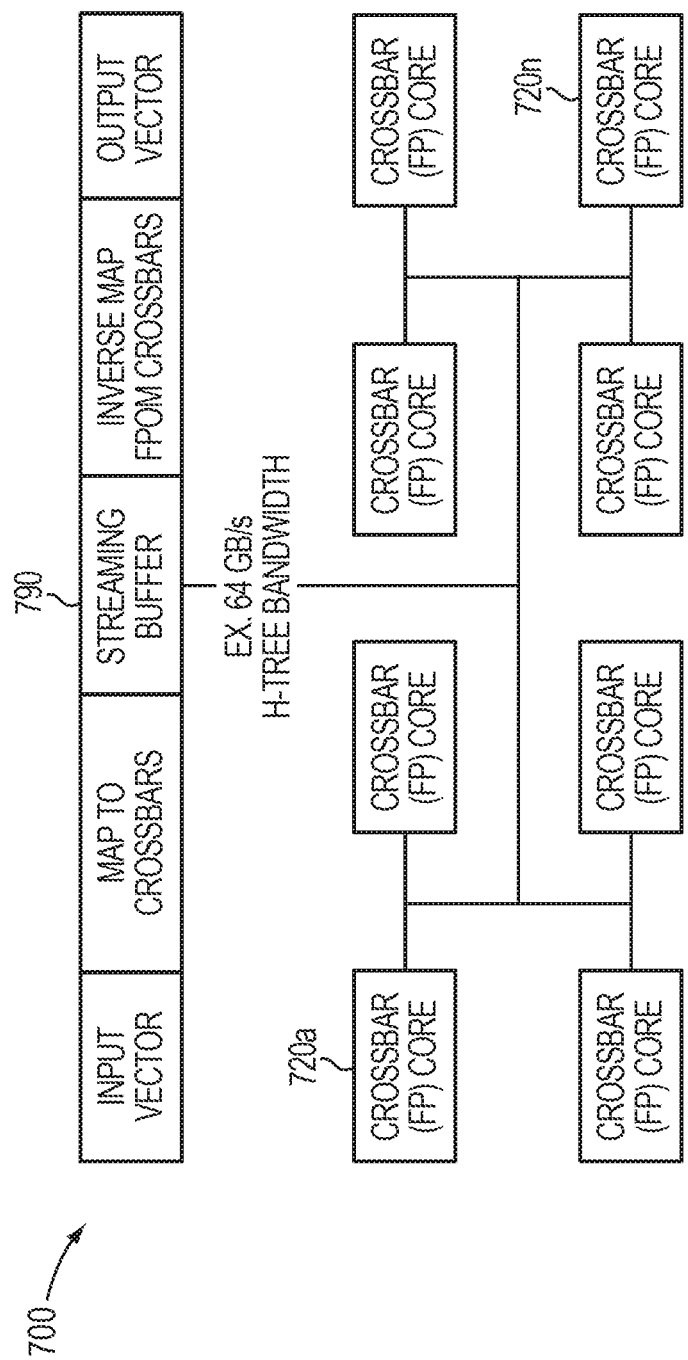
FIG. 7 is a block diagram of an H-tree architecture in one embodiment.

FIG. 7 is a block diagram of an H-tree architecture 700 in one embodiment. As described above, P×P parallel arrays of M×M crossbars can perform floating point operations. For a single precision computation, P is 6 and M is 32. Such a configuration (36 sets of 32×32 crossbars with 4 bits/cell for 32-bit floating point, or 4 sets of 32×32 crossbars with 5 bits/cell for 16-bit floating point) can be termed a "crossbar core," or "floating point core." Using an interface, such as a PCIe 4.0 interface, with 32 lanes enables 32-element input vectors to be fully input to the co-processor's floating point cores at 64 GB/s of bidirectional bandwidth. PCIe values may be aggregated as an input vector and mapped to specific crossbars for computation, which may be done on an FPGA.

The H-tree architecture 700 may include a plurality of crossbar cores 720*a-n* connected in an H-tree configuration to a common interface. Using a streaming buffer 790 to feed an H-Tree network of 8 such cores at 64 GB/s of H-Tree bandwidth yields 1 PB/s (250 TFLOPs single precision) of VMM computation (16 GT/s of 32-bit inputs*8 floating point cores*2016 floating point computations per core). Outputs of the floating-point cores may then be inversely mapped back to their corresponding input vector components and aggregated as an output vector to be returned to the sending device, which may also be done on an FPGA. The crossbar cores 720*a-n* of the H-tree architecture 700 may be configured to interface directly with the PCIe bus, avoiding the bandwidth asymmetry that can be present in processor-in-memory architectures that attempt to create internal device bandwidth at the TB/s scale.

Example embodiments described above provide an analog co-processor for applications requiring high computational speed and low power consumption. The co-processor is capable of solving partial differential equations arising in the scientific simulation of complex systems. Current PDE solution methods within scientific simulation are inefficient and often intractable due to limitations associated with discrete variable encoding and serial processing. Embodiments described above implement a set of PDE solution procedures by invoking vector matrix multiplication of input signals with multiplicative coefficients using the analog behavior of CMOS-memristor crossbar arrays.

Example embodiments may solve linear and non-linear PDEs by implementing spectral and Green's function solution methods as an alternative to massively discretized finite difference methods, while exploiting inherent parallelism realized through crossbar arrays. In the spectral method, an analog crossbar architecture may be used to convert PDEs into the Fourier domain. Once expressed in the Fourier domain, VMM and integration may be performed using the crossbar to arrive at a solution to the PDE by exploiting the Inverse Discrete Fourier Transform (IDFT) and the convolution theorem. Thus, partial differential equations of interest can be mapped to the analog crossbar Discrete Fourier Transform ("DFT") architecture, resulting in dramatically simpler Fourier expressions that increase the speed of PDE solution computation well beyond previous methods. Linear PDEs with far-reaching applicability, such as wave and heat equations, are solved in this fashion. Solutions to non-linear PDEs through linearization followed by Fourier domain representation, and the Navier-Stokes equations for incompressible fluid flow, are example applications.

A further method of solution to PDEs is the Green's function method. The Green's function method may not be feasible for solving a PDE on a traditional computer. However, embodiments described above, implementing circuitry such as memristor-CMOS crossbar, provide means for PDE solutions. A PDE has a formal mathematical solution that involves the Green's function:

$$T(x) = \int_\Omega G(x,x') S(x') dx'$$

where $G(x, x')$ is the Green's function. Every PDE has a particular Green's function. If the integral over the domain is approximated on a discrete mesh with N mesh cells per elements, then calculating the solution $T(x)$ in one cell requires summing over all the (N−1) other cells and solving for all the solution unknowns (in all the cells) requires order $N^2$ operations. Such an operation is computationally expensive because it is possible to find the solution to this problem in O(N) time. For this reason, the Green's function is rarely used as a primary solution technique for solving PDEs in prior approaches.

The computational cost can also be understood in terms of linear algebra and matrices. Once discretized, a PDE produces a matrix problem Ax=b, where A is an N×N sparse matrix with only O(N) non-zero entries, b is a source vector of N known values, and x is the unknown solution vector (with N entries). The Green's function, $G(x,x')$ is the equivalent of the matrix inverse. It is a full matrix and requires $N^2$ operations to multiply by the source and get the solution, via $x = A^{-1}b$.

Example embodiments described above make the Green's function approach viable again, as they perform the matrix multiplication operations in the analog domain. As a result, all the $N^2$ operations of a vector times a full matrix multiply (VMM) can be performed in a single cycle on a memristor crossbar array.

Such embodiments also applicable to Convolutional Neural Network (CNN)-based image recognition and Doppler filtering. CNN is an increasingly popular machine learning tool for object detection and recognition tasks. However, state-of-the-art embedded digital solutions require considerable power to perform typical CNN tasks (e.g., tasks on the AlexNet benchmark), failing to achieve real-time video operation or meet mobile device power budgets. Prior PDE solution techniques also involve GPUs, and face similar problems in computing efficiency. Further applications include Range-Doppler signal processing in radar systems. Significant reduction in size, weight and power (SWaP) of these platforms is required for signal processing in swarm intelligence and related applications, where real-time operation at power consumption of less than 1 W may be required. Example embodiments described above, by utilizing features such as analog crossbar VMM, can enable such applications under the above constraints.

Example embodiments can be implemented via CMOS and emerging nanotechnologies such as memristor or a hybrid technology consisting of both CMOS and memristor. Such an implementation provides a number of advantages in analog DFT realization, as an analog crossbar processor as described above can program the DFT coefficients and perform vector matrix multiplication with the input signals. In particular, an analog processor as described above can implement analog Discrete Fourier Transforms more than 1,024 points with 2 to 3 orders of magnitude improvement in computing speed and power consumption over digital system, with sufficient parallelization of base size crossbar arrays.

While this invention has been particularly shown and described with references to example embodiments thereof, it will be understood by those skilled in the art that various changes in form and details may be made therein without departing from the scope of the invention encompassed by the appended claims.

What is claimed is:

1. A co-processor circuit comprising:
   at least one vector matrix multiplication (VMM) core configured to perform a VMM operation, each VMM core comprising:
   at least one array of VMM circuits, each of the VMM circuits being configured to compute a respective product on T-bit subsets of an N-bit total for the VMM operation, each of the VMM circuits comprising:
   a signal generator configured to generate a programming signal based on at least one coefficient for the VMM operation;
   a memristor network having an array of analog memristor devices arranged in a crossbar configuration;
   a read/write control circuit configured to selectively enable read and write operations at the memristor network;
   a memristor control circuit configured to selectively enable a selection of the analog memristor devices, the memristor control circuit including a column switch multiplexor, a row switch multiplexor, and an address encoder;
   a write circuit configured to set at least one resistance value within the network based on the programming signal, the write circuit including a voltage driver;
   a read input circuit configured to apply at least one input signal to the memristor network, the input signal corresponding to a vector, the read input circuit including a voltage driver; and
   a readout circuit configured to read at least one current value at the memristor network and generate an output signal based on the at least one current value;
   a read circuit array to convert at least one input vector into an analog signal to be applied to the memristor network;
   a write circuit array to convert at least one set signal, based on a multiplicative coefficient, to an analog set signal to be applied to the memristor network;
   an ADC array to convert at least one VMM analog output from the memristor network into digital values;
   a shift register array configured to format the digital values of the ADC array;
   an adder array configured to add outputs from the memristor network arrays, each of the adders performing a subset of a VMM operation associated with the multiplicative coefficient; and
   a combiner configured to combine the output signal of each of the adder arrays to generate a combined output signal, the output signal of each adder array representing one of the respective products, the combiner being configured to aggregate the respective products into a combined output representing a solution to the VMM operation at floating point precision.

2. The circuit of claim 1, in which the read circuit array to convert at least one input vector and the write circuit array to convert at least one set signal are DACs.

3. The circuit of claim 1, further comprising a processor configured to generate a programming signal for the VMM circuits via digital values mapped to crossbar array inputs and memristor network resistance states to carry out the products on T-bit subsets of an N-bit total, outputs of the memristor networks being mapped from output voltage pulses to digital output values representing the products.

4. The circuit of claim 3, wherein the VMM operation includes at least one M-bit precision floating point computation.

5. The circuit of claim 4, wherein the VMM circuits configure the respective memristor network to represent floating point mantissas as T-bit subsets of an N-bit total including 8-bit, 16-bit, 32-bit, 64-bit, and 128-bit floating point precision, featuring N-bit mantissas of sizes 3, 10, 23, 52, and 112 bits, and T-bit subsets of 3, 5, 6, 7, and 8 respectively.

6. The circuit of claim 5, further comprising:
digital circuitry configured to normalize exponents corresponding to floating point values stored in memristor networks to directly enable floating point computation by aggregation of individual products on T-bit subsets of N-bit floating point mantissas including exponent sizes of 4, 5, 8, 11, 15 for floating point precision of 8-bit, 16-bit, 32-bit, 64-bit, and 128-bit respectively.

7. The circuit of claim 4, wherein the at least one VMM core includes a plurality of VMM cores organized into an H-Tree Network for distributed and parallel computation with equal propagation delay, and wherein the VMM cores are further configured to interface with a host processor.

8. The circuit of claim 4, wherein the VMM operation performed includes an operation to solve at least one partial differential equation (PDE) at floating point precision.

9. The circuit of claim 4, wherein the VMM operation performed corresponds to a Discrete Fourier Transform (DFT) at floating point precision.

10. The circuit of claim 9, wherein the VMM operation performed corresponds to a Discrete Fourier Transform (DFT) to solve partial differential equations through spectral methods at floating point precision.

11. The circuit of claim 9, wherein the VMM operation performed corresponds to a Discrete Fourier Transform (DFT) to perform range-doppler signal processing at floating point precision.

12. The circuit of claim 4, wherein the at least one coefficient for VMM corresponds to convolution coefficients to perform inference in a convolutional neural network at floating point precision.

13. The circuit of claim 4, wherein the VMM operation performed corresponds to a Green's function representation to solve partial differential equations at floating point precision.

14. The circuit of claim 4, wherein the VMM operation performed corresponds to a meshed Green's function representation to solve partial differential equations at floating point precision, where meshed Green's function representations are written onto one or more co-processor VMM cores to iteratively solve a partial differential equation.

15. The circuit of claim 4, wherein the VMM operation corresponds to an energy minimization optimization problem solved through a conjugate gradient method at floating point precision.

16. The circuit of claim 15, wherein the conjugate gradient method is configured to solve partial differential equations at floating point precision.

17. The circuit of claim 15, wherein the conjugate gradient method is configured to perform a backpropagation algorithm within a neural network at floating point precision.

* * * * *